Patented Mar. 7, 1933

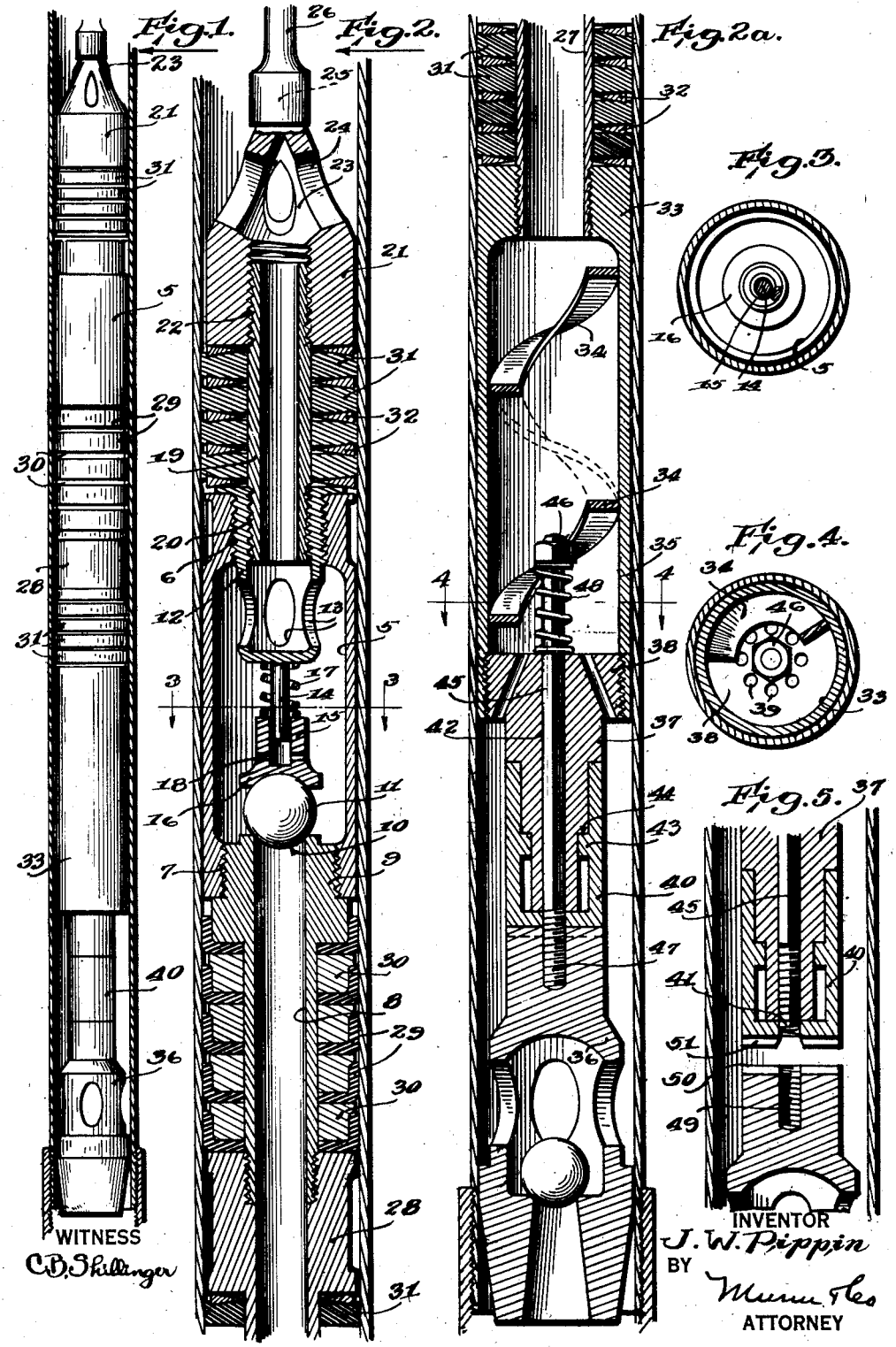

1,900,731

UNITED STATES PATENT OFFICE

JOHN W. PIPPIN, OF CORPUS CHRISTI, TEXAS, ASSIGNOR OF ONE-HALF TO H. R. GILES, OF NUECES COUNTY, TEXAS, AND ONE-HALF TO W. F. HALL AND GEORGE LOWREY, OF HARRIS COUNTY, TEXAS

WELL PLUNGER

Application filed February 17, 1930. Serial No. 429,189.

My invention relates to well plungers and has as one of its objects the provision of a well plunger wherein the various parts which are connected together by screw threads are prevented from becoming loosened or detached.

Further the invention provides a well plunger having means for causing the liquid passing therethrough to exert a torque upon the threadedly connected parts so that they cannot work loose.

Another object of the invention is to provide a well plunger which is equipped with buffing elements so that the working barrel will be polished incident to the reciprocation of the plunger and thereby cause the latter to operate in a smooth manner and cause the lifting cups to wear longer.

The invention also contemplates a well plunger having a ball valve which is instantaneously actuated to closed position after each down stroke of the plunger and which is cushioned against the impact of the upwardly flowing liquid.

It is another object of the invention to provide a well plunger which embodies a mechanism whereby the standing valve may be positively picked up or coupled to the plunger so that the standing valve may be lifted out when desired.

With the preceding and other objects and advantages in mind, the invention consists in the novel combination of elements, constructions and arrangements of parts and operations to be hereinafter more fully described, claimed and illustrated in the accompanying drawing, wherein:

Figure 1 is an elevation of my improved well plunger in working position and coupled to the standing valve;

Fig. 2 is an enlarged longitudinal section showing the upper half of the plunger;

Fig. 2a is a similar view showing the lower half of the plunger;

Fig. 3 is a horizontal section taken on the line 3—3 of Fig. 2;

Fig. 4 is a similar view taken on the line 4—4 of Fig. 2a; and

Fig. 5 is an enlarged detail view illustrating the plunger in the act of being coupled to the standing valve.

Referring to the invention in detail a cylindrical ball cage 5 having an interiorly threaded upper end 6 and an interiorly threaded lower end 7, is provided. Arranged below the ball cage 5 is a vertically extending conduit or pipe 8 having a circular exteriorly threaded head 9 which is threadedly engaged with the threads 7. The upper face of the head 9 is formed with a concavity or seat upon which a conventional ball valve 11 normally seats.

A cup-shaped member 12 is threadedly engaged with the interior screw thread 6 and depends within the ball cage 5 and has inlet openings 13 therein.

Depending from the bottom wall of the cup-shaped member and located in vertical alinement with the ball valve 11 is a stem 14. Slidably received on the stem 14 is a sleeve 15 having a circular head 16 whose under face is shaped to conform to the ball valve as shown. An expansible coil spring 17 is received on the stem with one end bearing against the bottom wall of the cup-shaped member and its opposite end bearing against the upper end of the sleeve 15 and normally presses the ball valve against its seat. Radial ports 18 are provided in the sleeve above the circular head 16 so that some of the liquid will find its way into the sleeve and cooperate with the spring 17 in cushioning the ball 11 when the latter is forced from its seat by the upwardly traveling liquid.

Arranged above the ball cage 5 is a vertically extending pipe or conduit 19 having its lower end threaded into the upper end of the cup-shaped member as at 20 and its upper end threaded into a head 21 as indicated at 22. The head 21 is provided with a hollow frusto-conical shaped upper end 23 having radially disposed outlet openings 24. A coupling shank 25 is formed with the upper end of the head and is connected to the usual pump rod 26.

Arranged below the conduit or pipe 8 and in longitudinal alinement therewith is a conduit or pipe 27 which is formed with a coupling collar 28 at its upper end which is threadedly engaged with the lower end of the conduit or pipe 8. The usual leather cups 29 and spacer elements 30 are received on the conduit or pipe 8 and are held in place by the head 9 and coupling collar 28. In order to polish the interior of the working barrel during the reciprocation of the plunger buffing rings 31 are arranged on the pipes or conduits 19 and 27. Preferably these buffing rings are formed from any suitable durable fiber or combination of cotton and rubberized material. However, these rings may be formed from any material having characteristics which will smooth or polish a metallic surface.

The buffing rings are of a diameter slightly greater than the ball cage 5 and arranged between the same are metallic spacer rings 32, the latter having their opposite faces bevelled towards the inner edges of the ring. From the description thus far given it will be seen that the interior of the working barrel will be continuously polished above and below the leather cups 29. Thus a smooth polished working surface will always be maintained. This not only causes a smoother operation of the barrel but adds materially to the life of the cups in that they will not be cut or subjected to undue friction.

Means are provided for exerting a torque on the plunger to prevent the various threaded connections from becoming loosened or uncoupled and comprises a cylinder 33 having one end threaded on the lower end of the pipe or conduit 27 and engaging the bottom most ring 32. Extending longitudinally in the cylinder is a spiral blade 34 which extends parallel to the side walls of the cylinder, and lies against the same. The blade is relatively narrow in cross section to present a relatively narrow lower spiral surface 35 with which the oil makes impact as it flows through the cylinder. It will be seen that this arrangement does not obstruct the flow through the cylinder and yet the liquid striking the surface 35 exerts sufficient torque as to maintain the various threaded connections tight. Not only are the threaded connections of the plunger held against loosening, but the various pump rods are maintained in threaded engagement.

The invention also contemplates means for coupling the standing valve 36 to the plunger when it is desired to lift the former. For this purpose a cylindrical shank 37 is arranged at the lower end of the cylinder 33 and is formed with a circular exteriorly threaded head 38 which is threaded into the lower end of the cylinder. A plurality of ports 39 are provided in the head through which the upwardly flowing column of liquid passes. A thimble 40 is revolubly mounted upon the circular shank 37 and is provided with a central threaded opening 41 in its lower end and which registers with a bore 42, rectangular in cross section, provided in the shank 37 and head 38. The thimble is swivelly connected with the shank by means of laterally extending lugs 43 formed upon the interior of the thimble at diametrically opposite points and which are received in a circumferential groove 44 formed on the shank adjacent at its lower end. A shank 45 rectangular in cross section is slidably mounted in the bore 42 and has one end projecting into the cylinder 33. A nut or other abutment 46 is received on the inner end of the shank. The lower end of the shank is provided with a rounded screw threaded part 47 which has threaded engagement with the threaded opening 41. The thimble is prevented against rotation by a coil spring 48 encircling the inner end of the shank with one end engaging the abutment 46 and its opposite end bearing against the head 38.

The upper end of the standing valve 36 is formed with a central threaded opening 49 which is located in vertical alinement with the opening 31 in the thimble. A key-way 50 is also provided in the upper face of the standing valve and is adapted to receive a key 51 formed on the under face of the thimble 40. As disclosed in Fig. 5 the threaded part 47 is normally retracted within the thimble. However, when it is desired to pick up the standing valve the plunger is lowered until the key 51 enters the key-way 50 in the standing valve. With the parts in this position the threaded openings 41 and 49 in the thimble and standing valve respectively are in registration. The plunger is now rotated and due to the fact that the thimble is held stationary by its engagement with the standing valve the threaded part 47 is fed outwardly through the threads 41 and threaded into the opening 49, as disclosed in Fig. 2a. The standing valve can now be lifted from the working barrel by lifting the plunger.

What is claimed is:

A movable valve body forming part of a pump plunger having an axial passage, the valve body having a chamber therein, a cup-shaped member threaded into the upper end of the valve body and projecting into the chamber, said cup-shaped member having a plurality of lateral passages placing the chamber in communication with the passage in the plunger, a stem projecting from the free end of the cup-shaped member, a sleeve slidably mounted on the stem and having a head provided with a curved face, a valve seat at the lower end of the chamber, a ball valve on the seat and normally engaged by the curved face, a spring on the stem and engaging at one end the free end of the cup-shaped member and at its other end the sleeve for maintaining the valve on its seat.

JOHN W. PIPPIN.